(12) United States Patent
Choi et al.

(10) Patent No.: US 9,978,998 B2
(45) Date of Patent: May 22, 2018

(54) BATTERY MODULE ARRAY COMPRISING UNDER-BASE BAR

(71) Applicant: LG CHEM, LTD., Seoul (KR)

(72) Inventors: Jong Woon Choi, Daejeon (KR); Dal-Mo Kang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 84 days.

(21) Appl. No.: 15/106,952

(22) PCT Filed: Apr. 1, 2015

(86) PCT No.: PCT/KR2015/003264
§ 371 (c)(1),
(2) Date: Jun. 21, 2016

(87) PCT Pub. No.: WO2015/152638
PCT Pub. Date: Oct. 8, 2015

(65) Prior Publication Data
US 2016/0336563 A1   Nov. 17, 2016

(30) Foreign Application Priority Data

Apr. 3, 2014   (KR) .................. 10-2014-0039964

(51) Int. Cl.
*H01M 2/00* (2006.01)
*H01M 2/20* (2006.01)
(Continued)

(52) U.S. Cl.
CPC ....... *H01M 2/1077* (2013.01); *H01M 2/1016* (2013.01); *H01M 2/1061* (2013.01); *H01M 2/1094* (2013.01); *H01M 2/202* (2013.01); *H01M 2/204* (2013.01); *H01M 2/206* (2013.01); *H01M 10/0481* (2013.01); *H01M 10/482* (2013.01); *H01M 10/613* (2015.04); *H01M 10/647* (2015.04); *H01M 10/6551* (2015.04); *H01M 10/6555* (2015.04);
(Continued)

(58) Field of Classification Search
CPC .......... H01M 10/6555; H01M 2/1061; H01M 2010/4278
See application file for complete search history.

(56) References Cited

U.S. PATENT DOCUMENTS 8,771,864 B2   7/2014 Lim
9,196,883 B2   11/2015 Kim et al.
(Continued)

FOREIGN PATENT DOCUMENTS

EP   2228851 A1   9/2010
JP   2011-49158 A   3/2011
(Continued)

OTHER PUBLICATIONS

International Search Report, issued in PCT/KR2015/003264, dated Jul. 29, 2015.

*Primary Examiner* — Matthew J Merkling
(74) *Attorney, Agent, or Firm* — Birch, Stewart, Kolasch & Birch, LLP

(57) ABSTRACT

Disclosed is a battery module array which has high space utilization and is easy to fabricate. The battery module array includes a plurality of battery modules, end plates, tension bars, a front sensing unit, a rear sensing unit, an under-base bar, a front cover, and a rear cover.

12 Claims, 8 Drawing Sheets

(51) Int. Cl.
  *H01M 2/10*      (2006.01)
  *H01M 10/04*     (2006.01)
  *H01M 10/48*     (2006.01)
  *H01M 10/647*    (2014.01)
  *H01M 10/6551*   (2014.01)
  *H01M 10/6555*   (2014.01)
  *H01M 10/613*    (2014.01)
  *H01M 10/653*    (2014.01)

(52) U.S. Cl.
  CPC ...... *H01M 10/653* (2015.04); *H01M 2220/10* (2013.01); *H01M 2220/20* (2013.01); *H01M 2220/30* (2013.01)

(56) References Cited

U.S. PATENT DOCUMENTS

| | | | |
|---|---|---|---|
| 9,583,748 B2* | 2/2017 | Choi | ................ H01M 2/206 |
| 2003/0099885 A1 | 5/2003 | Kim et al. | |
| 2011/0024205 A1 | 2/2011 | Nishihara et al. | |
| 2011/0052959 A1 | 3/2011 | Koetting et al. | |
| 2011/0293982 A1 | 12/2011 | Martz et al. | |
| 2012/0115016 A1 | 5/2012 | Kim | |
| 2012/0313559 A1 | 12/2012 | Tonomura et al. | |
| 2013/0177790 A1 | 7/2013 | Yang et al. | |
| 2013/0330584 A1 | 12/2013 | Lee et al. | |
| 2015/0140409 A1 | 5/2015 | Hayashida et al. | |
| 2016/0141712 A1* | 5/2016 | Choi | ................ H01M 2/1016 320/109 |

FOREIGN PATENT DOCUMENTS

| | | |
|---|---|---|
| JP | 2012-174693 A | 9/2012 |
| JP | 2013-503432 A | 1/2013 |
| JP | WO2013/179797 A1 | 12/2013 |
| KR | 10-2001-0097437 A | 11/2001 |
| KR | 10-2002-0065293 A | 8/2002 |
| KR | 10-0765659 B1 | 10/2007 |
| KR | 10-2011-0059356 A | 6/2011 |
| KR | 10-2012-0047800 A | 5/2012 |
| KR | 10-2012-0126893 A | 11/2012 |
| WO | WO 2012/042914 A1 | 4/2012 |

* cited by examiner

BATTERY MODULE ARRAY COMPRISING UNDER-BASE BAR

TECHNICAL FIELD

The present application claims the benefit of Korean Patent Application No. 10-2014-0039964 filed on Apr. 3, 2014 with the Korean Intellectual Property Office, the disclosure of which is incorporated herein by reference in its entirety.

The present disclosure relates to a battery module array, and more particularly, to a battery module array which has high space utilization and is easy to fabricate.

BACKGROUND ART

A secondary battery having good application to various product groups and good electric characteristics such as high energy density is widely applied to not only portable devices but also an electric vehicle (EV) or a hybrid electric vehicle (HEV) driven by an electric driving source. The secondary battery has a primary advantage of greatly reducing the use of fossil fuels and a secondary advantage of generating no byproduct in use of energy, and thus attracts attention as a new energy source for enhancing environment-friendly and energy-efficient properties.

Lithium ion batteries, lithium polymer batteries, nickel cadmium batteries, nickel hydrogen batteries, nickel zinc batteries or the like are widely used as secondary batteries at the present. Such a unit secondary battery cell has an operating voltage of about 2.5V to 4.2V. Therefore, if a higher output voltage is demanded, a plurality of secondary battery cells may be connected in series to configure a battery pack. In addition, according to a charge/discharge capacity demanded to the battery pack, a plurality of secondary battery cells may also be connected in parallel to configure a battery pack. Therefore, the number of secondary battery cells included in the battery pack may be various set depending on a demanded output voltage or charge/discharge capacity.

Meanwhile, if a plurality of secondary battery cells is connected in series or in parallel to configure a battery pack, in general cases, two or more secondary battery cells are assembled to configure a battery module, a plurality of battery modules is assembled to configure a battery module array, and other components are added to the battery module array, thereby configuring a battery pack. At this time, the shape of the battery module array is determined depending on electric connection or mechanical connection among the plurality of battery modules.

Meanwhile, Korean Unexamined Patent Publication No. 10-2012-0047800 is one of documents disclosing a battery module array and a battery module. In this document, the battery module array is simply expressed as having a box shape, but the entire shape of the battery pack is greatly influenced by the shape of the battery module array. In addition, the shape of the battery module array is greatly influenced by the shape of the battery module. Therefore, there is needed a battery module with good space utilization which has high space utilization and is easy to fabricate.

DISCLOSURE

Technical Problem

The present disclosure is designed to solve the problems of the related art, and therefore the present disclosure is directed to providing a battery module array which has high space utilization and is easy to fabricate.

Other objects and advantages of the present disclosure will be understood by the following description, and it is understood that these can be achieved by means, methods or a combination thereof which are defined in the claims.

Technical Solution

In one aspect of the present disclosure, there is provided a battery module array, which includes a plurality of battery modules each including two secondary battery cells, a module frame, and a cooling fin; end plates located at both side surfaces of a battery module assembly in which the plurality of battery modules are assembled; a tension bar in '[' shape contacting an upper end of the battery module assembly and being fixed to the end plates; a front sensing unit including sensing bus bars electrically connected to electrode leads of the battery modules included in the battery module assembly, a terminal bus bar, and a housing, the front sensing unit being located at a front portion of the battery module assembly; a rear sensing unit including sensing bus bars electrically connected to the electrode leads of the battery modules included in the battery module assembly, and a housing, the rear sensing unit being located at a rear portion of the battery module assembly; at least one under-base bar located at a lower end of the battery module assembly and fixed to the end plates; a front cover configured to keep the front portion of the battery module assembly from being exposed to outside; and a rear cover configured to keep the rear portion of the battery module assembly from being exposed to outside.

According to an embodiment of the present disclosure, the battery module array may include two under-base bars, and the two under-base bars may be: a first under-base bar located at a front lower end of the battery module assembly; and a second under-base bar located at a rear lower end of the battery module assembly, respectively.

According to an embodiment of the present disclosure, the end plates and the under-base bars may be fixed by bolts.

According to an embodiment of the present disclosure, the module frame may have a rectangular frame shape, may have a slit formed in a lower surface thereof to allow the cooling fin to be inserted therethrough, and may be interposed between the two secondary battery cells.

According to an embodiment of the present disclosure, the battery module array may additionally include an insulating sheet interposed between the battery module assembly and the end plates. A material of the insulating sheet may be made of ethylene propylene diene monomer (EPDM) rubber.

According to an embodiment of the present disclosure, the end plates may have grooves with threads formed therein, the tension bars may include grooves formed at locations corresponding to the grooves of the end plates, and the end plates and the tension bars may be fixed by a bolt.

According to an embodiment of the present disclosure, the front sensing unit as well as the rear sensing unit may include a connector connectible with an external device.

According to an embodiment of the present disclosure, the front cover may include an electrode terminal electrically connected with the terminal bus bar, and the electrode terminal may be exposed to an outer surface of the front cover.

According to an embodiment of the present disclosure, there is provided a battery module array which may be a component of a battery pack that includes the battery module array and a battery protection circuit.

According to an embodiment of the present disclosure, there is provided a battery pack which may be a component of a battery-driven system that includes the battery pack: and a load supplied with power from the battery pack. In one example, the load may be an electrically-driven means or a portable device.

Advantageous Effects

The present disclosure gives the following effects. According to an aspect of the present disclosure, high space utilization can be offered by configuring a battery module array with two-cell battery module.

According to another aspect of the present disclosure, battery module array in a variety of sizes and with a variety of charge/discharge capacities can be fabricated with the standardized two-cell battery module.

According to yet another aspect of the present disclosure, fabrication work of a battery module array is facilitated due to use of an under-base bar.

According to another aspect of the present disclosure, the sensing units are easily coupled to the battery module array, and the covers not only protect the sensing units, but also keep these in a stably coupled state.

According to another aspect of the present disclosure, fabrication cost can be kept reasonable due to use of one frame located at a center.

According to another aspect of the present disclosure, fabrication can be facilitated, since it is not necessary to separately use bolts or to form nut grooves for coupling the battery modules to one another.

DESCRIPTION OF DRAWINGS

The accompanying drawings illustrate preferred embodiments of the present disclosure and, together with the foregoing disclosure, serve to provide further understanding of the technical features of the present disclosure. However, the present disclosure is not to be construed as being limited to the drawings.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

Figure 1:
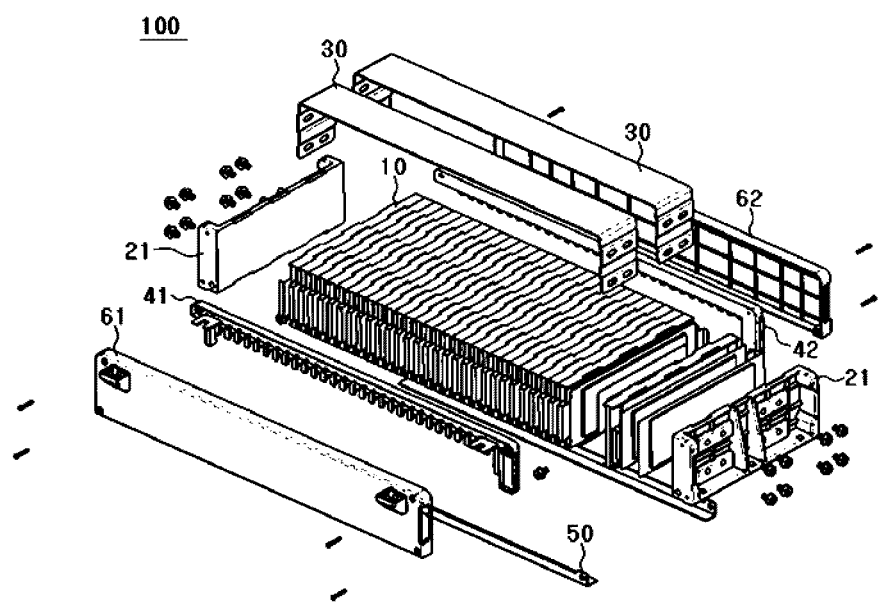
FIG. 1 is an exploded perspective view illustrating a battery module array according to an embodiment of the present disclosure.

FIG. 1 is an exploded perspective view illustrating a battery module array according to an embodiment of the present disclosure.

Referring to FIG. 1, a battery module array 100 according to an embodiment of the present disclosure includes a plurality of battery modules 10, two end plates 21, two tension bars 30, a front sensing unit 41, a rear sensing unit 42, an under-base bar 50, a front cover 61 and a rear cover 62. Hereinafter, the battery module array according to an embodiment of the present disclosure will be described according to an assembling process of the battery module array.

Figure 2:
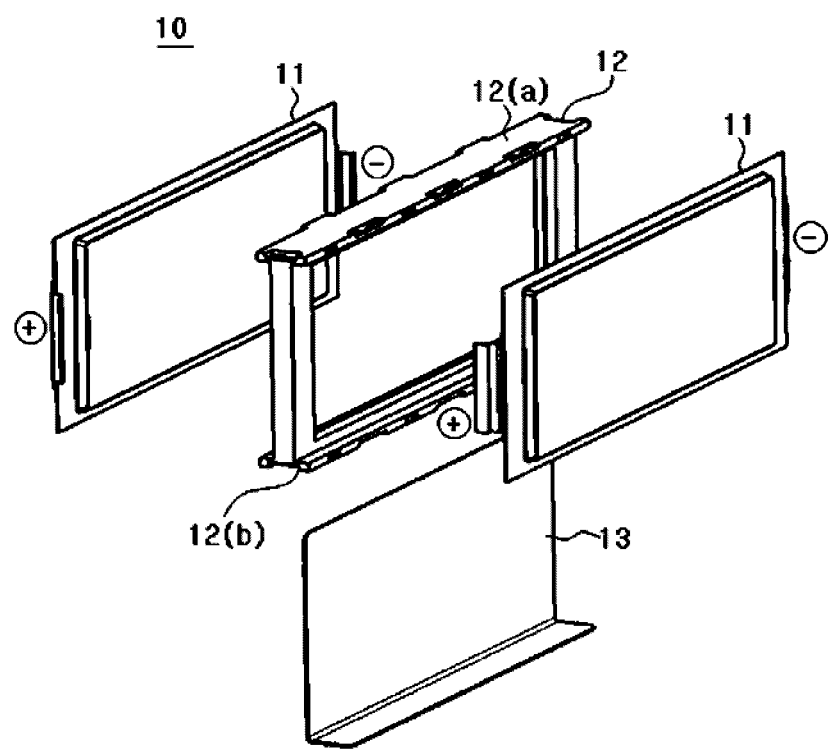
FIG. 2 is an exploded perspective view illustrating a battery module according to an embodiment of the present disclosure.

FIG. 2 is an exploded perspective view illustrating a battery module according to an embodiment of the present disclosure.

Referring to FIG. 2, the battery modules 10 according to an embodiment of the present disclosure each includes two secondary battery cells 11, a module frame 12, and a cooling fin 13.

The secondary battery cells 11 are not specifically limited herein in its kind. Each of the secondary battery cells 11 may include a battery which is rechargeable and takes the required charge or discharge voltage into consideration, such as a lithium ion battery, a lithium polymer battery, a nickel cadmium battery, a nickel hydrogen battery, a nickel zinc battery, and so on. Preferably, for the secondary battery cells 11, lithium polymer batteries may be used. Further, the secondary battery cells 11 may be categorized into pouch-type, cylindrical-type, rectangular-type, and so on, depending on the type of exterior material. Preferably, for the secondary battery cells 11, the pouch-type secondary battery cells may be used.

The module frame 12 has a rectangular frame shape so that the secondary battery cells 11 are fixed on both side surfaces thereof. Further, an upper surface 12a and a lower surface 12b of the module frame 12 may have a flat shape, since these will be the upper surface and the lower surface of the battery module array that are exposed to outside once the battery module array is constructed. Further, the module frame 12 may have such a shape that it can be engaged with another adjacent battery module frame and fixed. Further, a slit is formed in the lower surface 12b of the module frame 12 so that the cooling fin 13 is inserted therethrough. Further, the module frame 12 has such a shape (e.g., rectangular frame shape) that the center thereof is open to allow the cooling fin 13 to be in contact with the secondary battery cells 11. The battery module 10 described above may be referred to as a 'center-frame-type two-cell battery module'.

The module frame 12 may be made of polymer material. Preferably, the module frame 12 may be made of PA66.

The cooling fin 13 plays a role of releasing heat from the secondary battery cells 11 by indirect cooling. Although FIG. 2 illustrates an L-shaped cooling fin, a T-shaped, or an I-shaped cooling fin may also be used. The cooling fin 13 may be made of metal. Preferably, the cooling fin 13 may be made of aluminum.

Figure 3:
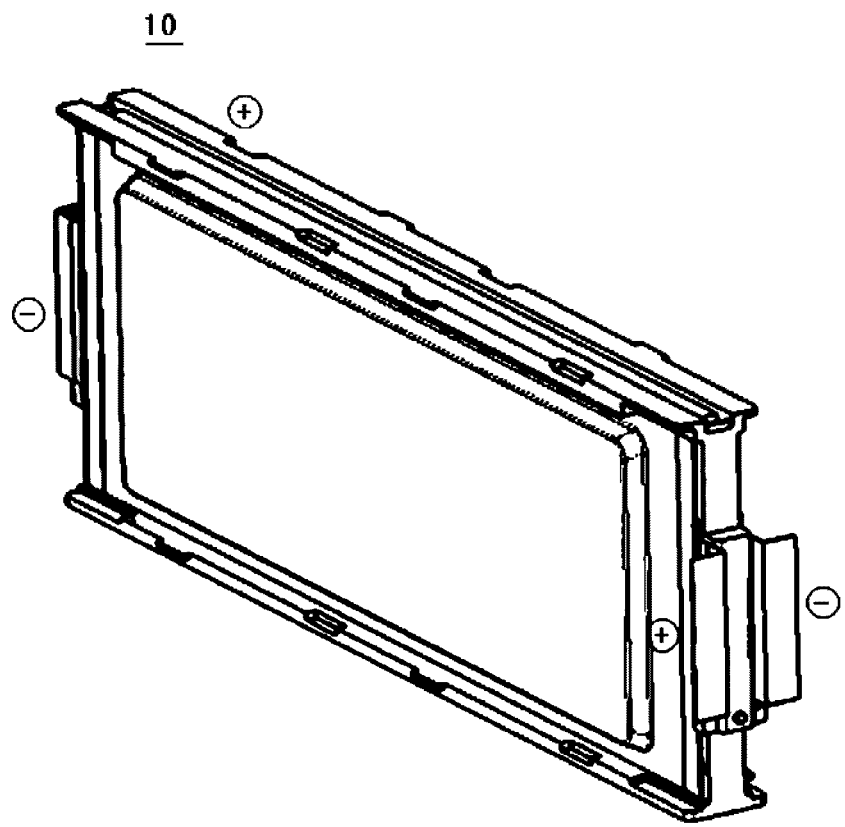
FIG. 3 is a perspective view illustrating a battery module according to an embodiment of the present disclosure in an assembled state.

FIG. 3 is a perspective view illustrating a battery module according to an embodiment of the present disclosure in an assembled state.

The coupling relations among the components illustrated in FIG. 2 can be understood by referring to FIG. 3.

Meanwhile, the battery module 10 may be categorized into two types. One is parallel-type (P-type) module in which the electrode leads of same polarity formed on the two secondary battery cells 11 are exposed in the same direction. The other is serial-type (S-type) module in which the electrode leads of same polarity formed on the two secondary battery cells 11 are exposed in different directions. The battery module 10 illustrated in FIG. 2 is the P-type module, and the battery module 10 illustrated in FIG. 3 is the S-type module.

The battery module array 100 may include only one type between the P-type module and the S-type module, or may include both the P-type and the S-type modules. Further, the battery module array 100 includes a plurality of battery modules 10. However, an embodiment of the present disclosure is not limited to any specific number of the battery modules 10.

Figure 4:
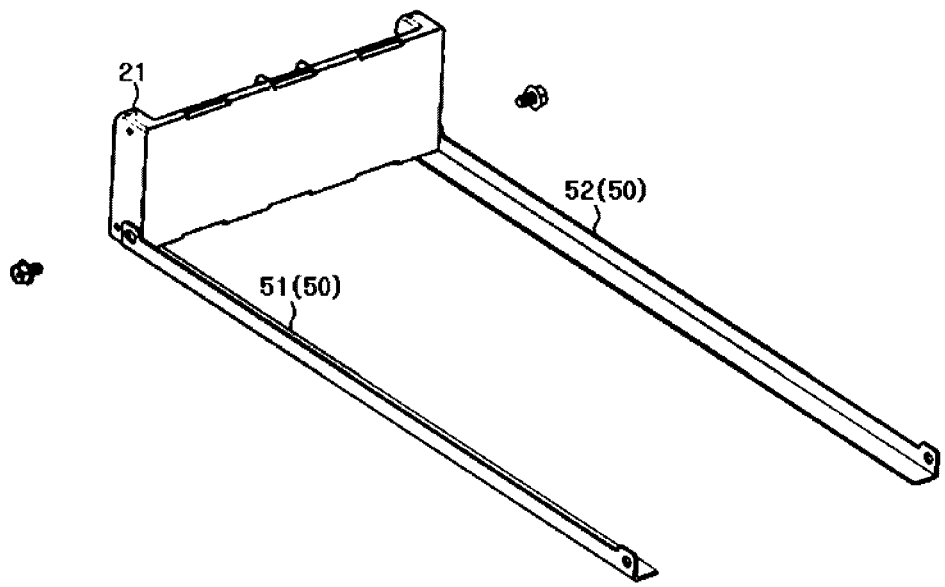
FIG. 4 is a diagram for reference, provided to explain coupling relation between under-base bars and one of end plates.

FIG. 4 is a diagram for reference, provided to explain coupling relation between under-base bars and one of end plates.

Referring to FIG. 4, one end plate 21 is coupled with one end of each of the two under-base bars 50. Each of the two under-base bars 50 has a groove formed in one end, and the end plate 21 also has grooves formed in both side surfaces, for bolt-coupling between the two under-base bars and the end plate. The two under-base bars may each be referred to as a "first under-base bar 51" and a "second under-base bar 52".

Figure 5:
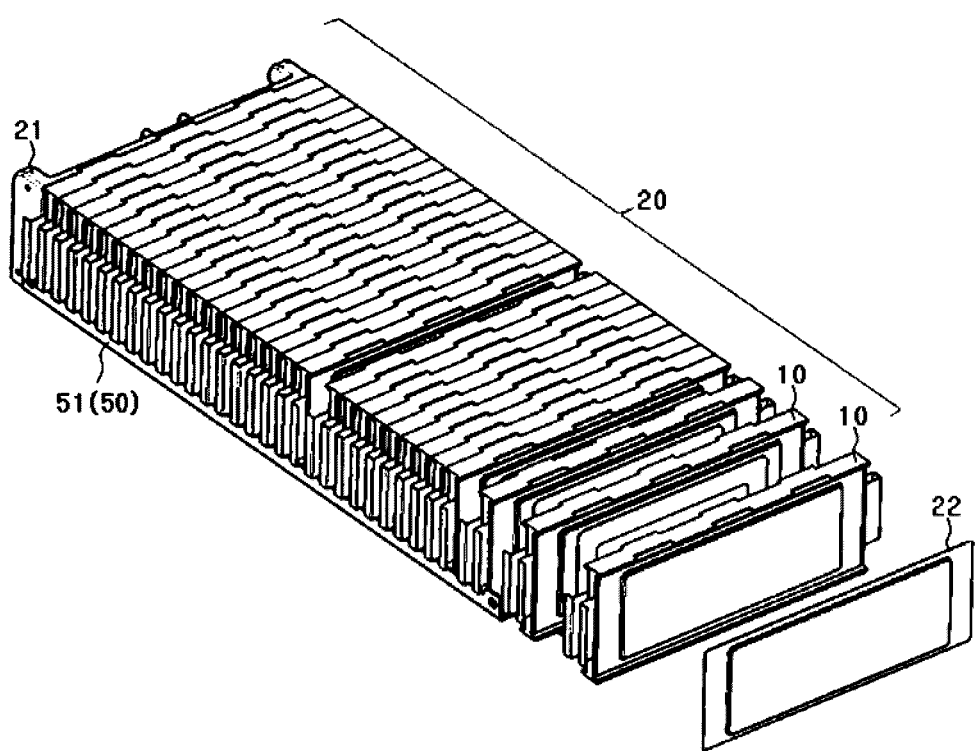
FIG. 5 is a diagram for reference, provided to explain coupling relation among a plurality of battery modules, an end plate and under-base bars.

FIG. 5 is a diagram for reference, provided to explain coupling relation among a plurality of battery modules, an end plate and under-base bars.

FIG. 5 shows a plurality of battery modules 10 being assembled. The assembly of a plurality of battery modules 10 as shown may be referred to as a "battery module assembly 20". The end plate 21 is located on a side surface of the battery module assembly 20.

The first under-base bar 51 is located at a front lower end of the battery module assembly 20. The second under-base bar 52 is located at a rear lower end of the battery module assembly 20. The under-base bar 50 facilitates assembling of a plurality of battery modules 10 into the battery module assembly 20. As illustrated in FIGS. 4 and 5, the under-base bar 50 is a plate elongated in one direction, and may be formed in a bent shape in a direction perpendicular to a lengthwise direction in which the plate is elongated. As such, the under-base bar 50 in the shape of bent plate can provide supporting force in a direction from the lower portion toward the upper portion, and can provide supporting force in a direction (front-back direction) toward the interior where the battery module assembly 20 will be disposed. Accordingly, the under-base bar 50 allows the battery module assembly 20 to be stably seated and also ensures that the battery module assembly has securer mechanical coupling.

According to an embodiment of the present disclosure, the battery module array may additionally include an insulating sheet 22 interposed between the battery module assembly 20 and the end plates 21. There may be two insulating sheets 22 so that each of the insulating sheets 22 may be interposed between the battery module assembly 20 and the two end plates 21. The insulating sheet 22 may be made of polymer material. Preferably, the insulating sheet 22 may be made of ethylene propylene diene monomer (EPDM) rubber.

Figure 6:
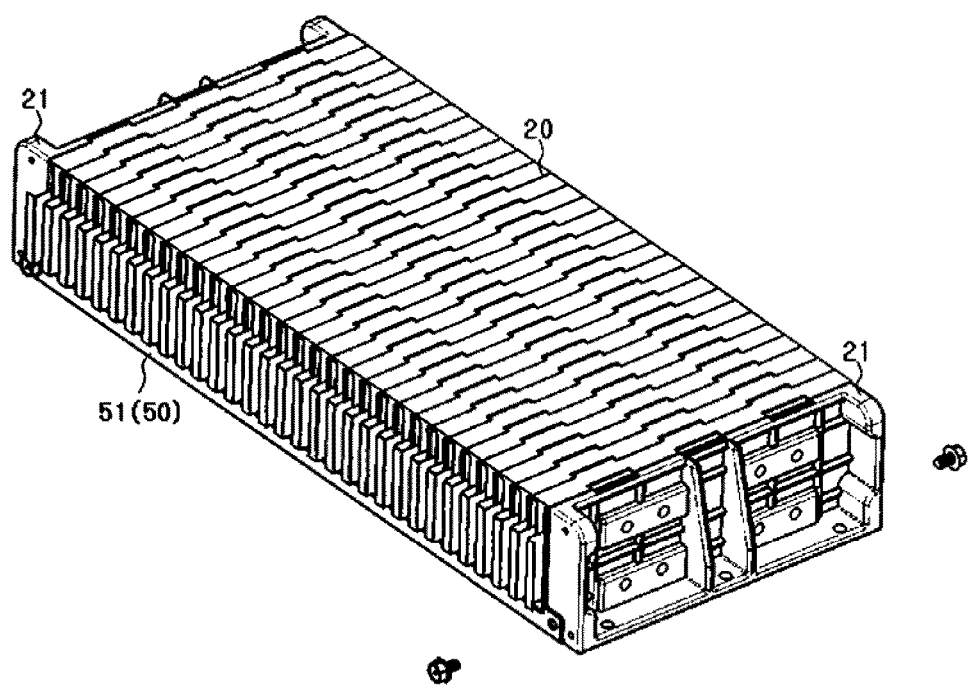
FIG. 6 is a diagram for reference, provided to explain coupling relation between an under-base bar and the other one of end plates.

FIG. 6 is a diagram for reference, provided to explain coupling relation between an under-base bar and the other one of end plates.

FIG. 6 shows that the other one of the end plates 21 is coupled with the other end of each of the two under-base bars 50. In this case, coupling between the under-base bar 50 and the two end plates 21 can provide supporting force in a left-right direction.

In this case, the two end plates 21 and the under-base bars 50 are fixed by bolts.

Figure 7:
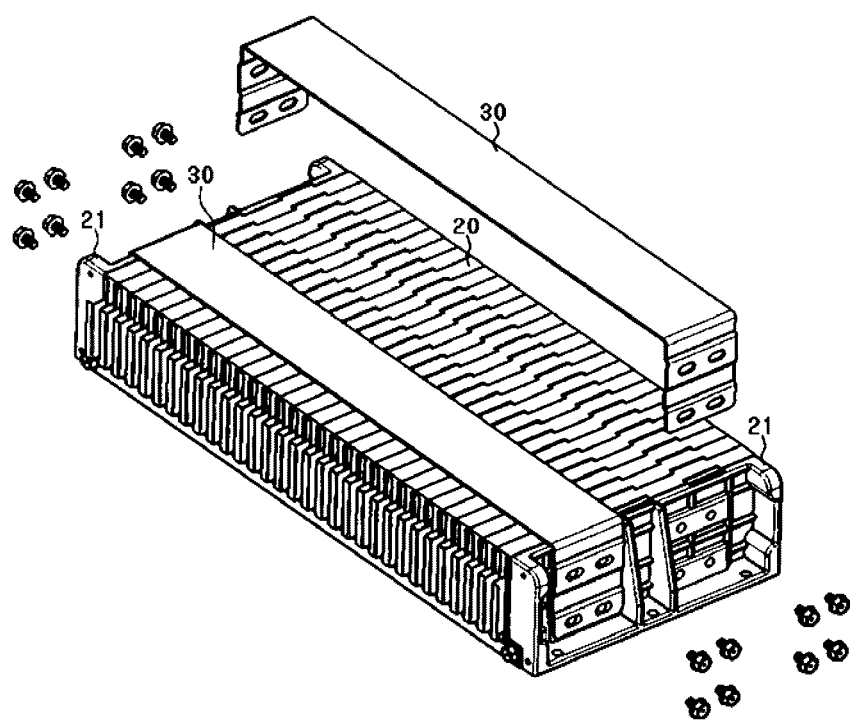
FIG. 7 is a diagram for reference, provided to explain coupling relations between tension bars and the battery module assembly according to an embodiment of the present disclosure.

FIG. 7 is a diagram for reference, provided to explain coupling relations between tension bars and the battery module assembly according to an embodiment of the present disclosure.

Referring to FIG. 7, the two tension bars 30 have T shape. The two tension bars 30 are then brought into contact with the upper end of the battery module assembly, and fastened to the end plates 21. As illustrated in FIG. 7, the tension bars 30 can provide supporting force in a left-right direction that is perpendicular to the front-back direction, and can provide the upper portion with supporting force in a downward direction. The coupling between the under-base bars 50 and the end plates 21 provides the battery module assembly 20 with the supporting forces in top-bottom direction and front-back direction, and the tension bars 30 provide the battery module assembly 20 with the supporting force in the left-right direction. Accordingly, the battery module assembly 20 can maintain secure coupling state.

According to an embodiment of the present disclosure, the end plates 21 include grooves having threads formed therein. The tension bars 30 have grooves at locations corresponding to the grooves of the end plates 21. Further, the end plates 21 and the tension bars 30 are fastened by the bolts 31. The tension bars 30 play a role of securely fixing the battery module assembly 20 structure.

Figure 8:
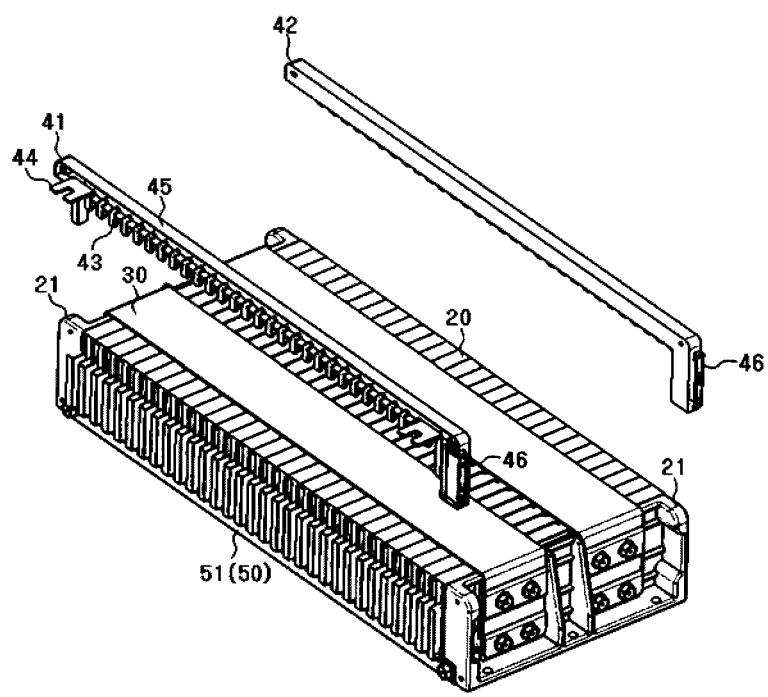
FIG. 8 is a diagram for reference, provided to explain coupling relations among a battery module assembly, and a front sensing unit and a rear sensing unit.

FIG. 8 is a diagram for reference, provided to explain coupling relations among a battery module assembly, and a front sensing unit and a rear sensing unit.

The front sensing unit 41 includes sensing bus bars 43 connected electrically to the electrode leads of all the battery modules 10 included in the battery module assembly 20, a terminal bus bar 44 and a housing 45. The front sensing unit 41 is located at a front portion of the battery module assembly 20.

The rear sensing unit 42 includes sensing bus bars 43 connected electrically to the electrode leads of all the battery modules included in the battery module assembly 20, and a housing 45. The rear sensing unit 42 is located at a rear portion of the battery module assembly 20.

The front sensing unit 41 and the rear sensing unit 42 may each include a connector 46 connectible to an external device.

The sensing bus bars 43 are components provided for electrical connection with a voltage measuring equipment to measure voltages of the respective battery modules 10 included in the battery module assembly 20. The voltage measuring equipment may be connected through the connector 46, and the voltage measuring equipment may be a battery management system for controlling charging and discharging of the battery module array 100 according to an embodiment of the present disclosure.

Figure 9:
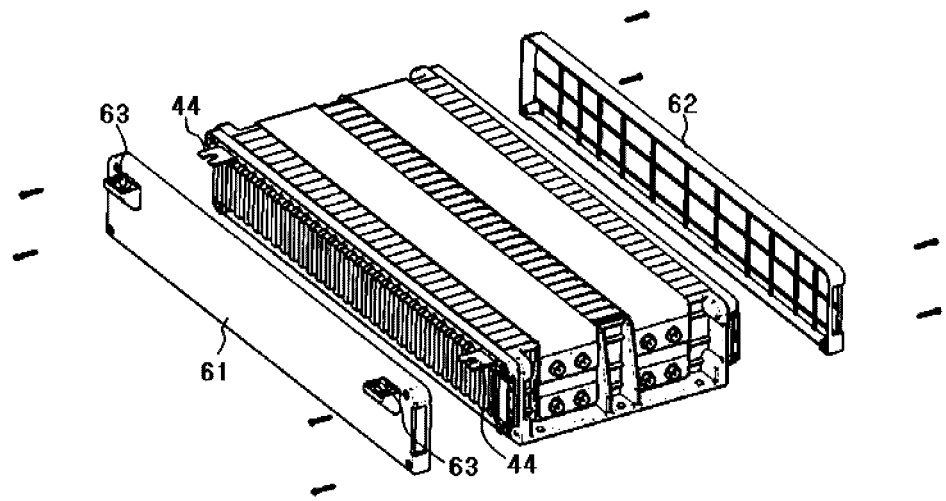
FIG. 9 is a diagram for reference, provided to explain coupling relations between a front cover, a rear cover, and a battery module assembly according to an embodiment of the present disclosure.

FIG. 9 is a diagram for reference, provided to explain coupling relations between a front cover, a rear cover, and a battery module assembly according to an embodiment of the present disclosure.

Referring to FIG. 9, the front cover 61 plays a role of keeping the front portion of the battery module assembly 20 from exposure to outside. That is, the front cover 61 is disposed and coupled at a front portion of the battery module assembly 20 to cover the front portion of the battery module assembly 20. Likewise, the rear cover 62 plays a role of keeping the rear portion of the battery module assembly 20 from exposure to outside. That is, the rear cover 62 is disposed and coupled at a rear portion of the battery module assembly 20 to cover the rear portion of the battery module assembly 20.

According to an embodiment of the present disclosure, the front cover 61 includes an electrode terminal 63 electrically connected with the terminal bus bar 43. The electrode terminal 63 is exposed to an outer surface of the front cover 61. The electrode terminal 63 is the terminal that is connected with an external device for charging and discharging of the battery module array 100. The charging current and discharging current flow through the electrode terminal 63. Further, the front cover 61 and the rear cover 62 each includes a connector exposure groove allowing the connector of the front sensing unit 41 and the connector 46 of the rear sensing unit 42 to be exposed therethrough. The connector exposure groove is formed at a location corresponding to that of the connector 46.

Figure 10:
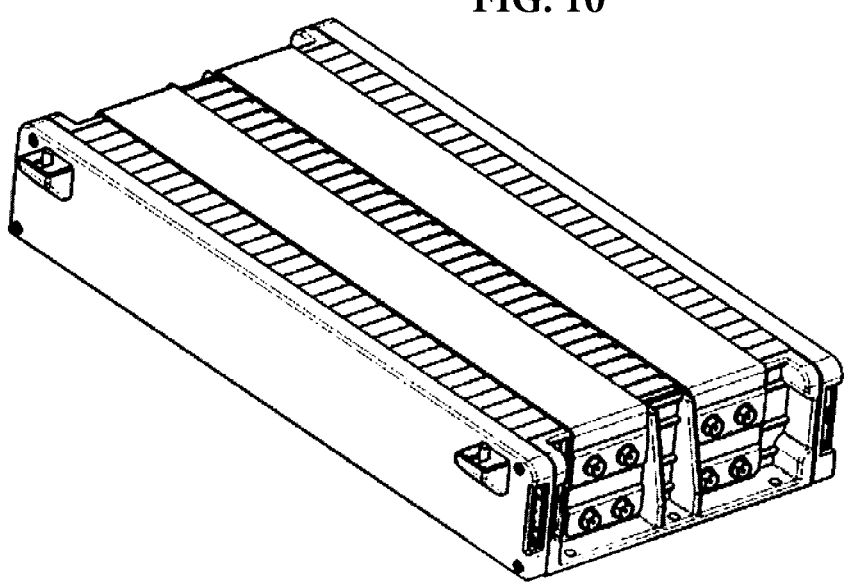
FIG. 10 is a perspective view illustrating a battery module array according to an embodiment of the present disclosure in an assembled state.

FIG. 10 is a perspective view illustrating a battery module array according to an embodiment of the present disclosure in an assembled state.

FIG. 10 shows the completed shape of the battery module array 100 according to the embodiments of the present disclosure described with reference to FIGS. 1 to 9.

According to an embodiment of the present disclosure, the battery module array 100 may be a component of a battery pack (not illustrated) which includes the battery module array 100 and a battery protection circuit (not illustrated).

According to an embodiment of the present disclosure, the battery pack may be a component of a battery-driven system which includes the battery pack and a load supplied with power from the battery pack. For example, the battery-driven system may be an electric vehicle (EV), a hybrid electric vehicle (HEV), an electric bike (E-bike), a power tool, an energy storage system, an uninterruptable power supply (UPS), a portable computer, a portable phone, a portable audio device, a portable video device, and so on. The load may be, for example, a motor for providing a rotational force with the power supplied from the battery pack, or a power conversion circuit for converting the power supplied from the battery pack into a power necessary for various circuit components.

According to an embodiment of the present disclosure, when the battery module array is constructed with two-cell battery module, high space utilization can be provided. Further, a battery module array in a variety of sizes and with a variety of charge/discharge capacities can be fabricated with the standardized two-cell battery module.

Meanwhile, use of the under-base bar according to the present disclosure facilitates work process. Further, by employing the sensing units, the work process can be facilitated and the fabrication cost can be reduced. Further, a considerable amount of fabrication cost is not necessary due to use of one frame located at a center.

Further, according to an embodiment of the present disclosure, fabrication is facilitated, since there is no need to separately use bolts or to form nut grooves for coupling of the battery modules to one another.

While the embodiments of the present disclosure have been described with reference to an example in which passive elements are added in a singular number for convenience of explanation, it will be appreciated that two or more passive components may be added in combination. Accordingly, the present disclosure is not limited to the scope of the embodiments presented for exemplary purpose.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A battery module array, comprising:
a plurality of battery modules, each including two secondary battery cells, a module frame, and a cooling fin;
end plates located at both side surfaces of a battery module assembly in which the plurality of battery modules are assembled;
a u-shaped tension bar contacting an upper end of the battery module assembly and fixed to the end plates;
a front sensing unit including sensing bus bars electrically connected to electrode leads of the battery modules included in the battery module assembly, a terminal bus bar, and a housing, the front sensing unit being located at a front portion of the battery module assembly;
a rear sensing unit including sensing bus bars electrically connected to the electrode leads of the battery modules included in the battery module assembly, and a housing, the rear sensing unit being located at a rear portion of the battery module assembly;
at least one under-base bar located at a lower end of the battery module assembly and fixed to the end plates;
a front cover configured to keep the front portion of the battery module assembly from being exposed to outside; and
a rear cover configured to keep the rear portion of the battery module assembly from being exposed to outside.

2. The battery module array according to claim 1, wherein the battery module array includes two under-base bars, and the two under-base bars are:
a first under-base bar located at a front lower end of the battery module assembly; and
a second under-base bar located at a rear lower end of the battery module assembly, respectively.

3. The battery module array according to claim 1, wherein the end plates and the under-base bars are fixed by bolts.

4. The battery module array according to claim 1, wherein the module frame has a rectangular frame shape, has a slit formed in a lower surface thereof to allow the cooling fin to be inserted therethrough, and is interposed between the two secondary battery cells.

5. The battery module array according to claim 1, wherein the battery module array further includes an insulating sheet interposed between the battery module assembly and the end plates.

6. The battery module array according to claim 5, wherein the insulating sheet is made of ethylene propylene diene monomer (EPDM) rubber.

7. The battery module array according to claim 1, wherein the u-shaped tension bar is provided in plurality as two u-shaped tension bars arranged in parallel, the end plates have grooves with threads formed therein,
the u-shaped tension bars have grooves formed at locations corresponding to the grooves of the end plates, and the end plates and the u-shaped tension bars are fixed by a bolt.

8. The battery module array according to claim 1, wherein the front sensing unit as well as the rear sensing unit includes a connector connectible with an external device.

9. The battery module array according to claim 1, wherein the front cover includes an electrode terminal electrically connected with the terminal bus bar, and the electrode terminal is exposed to an outer surface of the front cover.

10. A battery pack, comprising:
a battery module array defined in claim 1; and
a battery protection circuit.

11. A battery-driven system, comprising:
a battery pack as defined in claim 10; and
a load supplied with power from the battery pack.

12. The battery-driven system according to claim 11, wherein the load is an electrically-driven means or a portable device.

* * * * *